United States Patent Office 3,666,625
Patented May 30, 1972

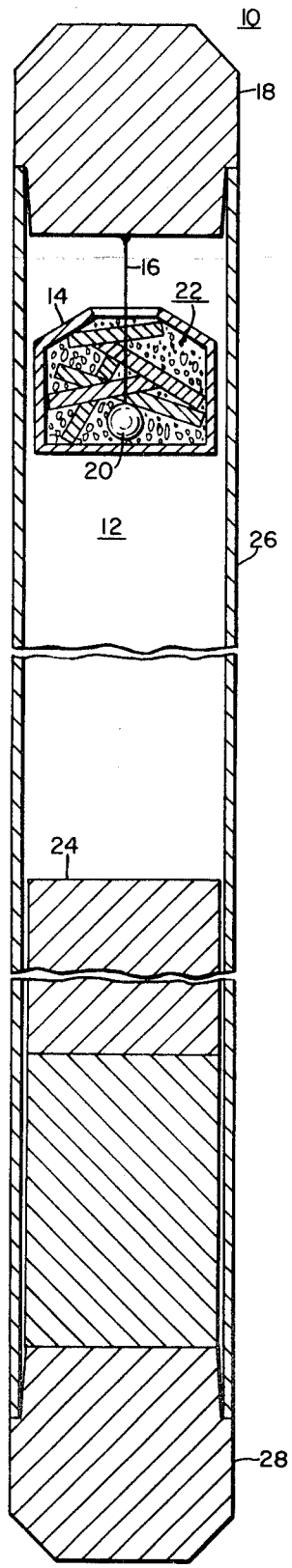
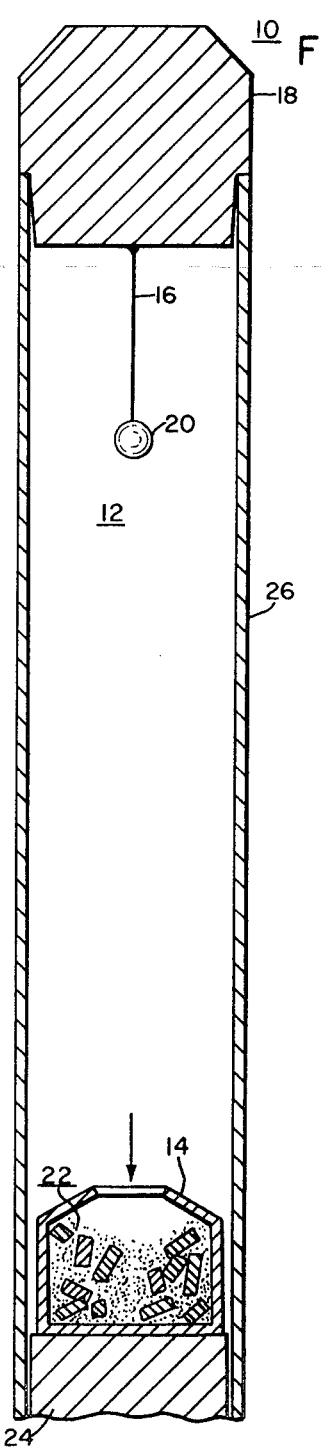

3,666,625
DEVICE FOR DETECTION AND LOCATION OF FAILED NUCLEAR FUEL ELEMENTS
Sigurd A. Nybo, Penn Hills, Pa., assignor to Westinghouse Electric Corporation, Pittsburgh, Pa.
Filed Dec. 16, 1969, Ser. No. 885,407
Int. Cl. E21b 21/04; E21c 7/00
U.S. Cl. 176—68          8 Claims

ABSTRACT OF THE DISCLOSURE

Apparatus for testing for nuclear fuel element cladding failures comprising a device such as a magnetic member suspended within the gas plenum of a clad nuclear fuel element. When a cladding failure occurs, water or ambient fluid diffuses into the plenum and reacts with the device to cause a physical displacement of the device. Means are provided for locating a change in the position of the device and thereby detecting the cladding failure. Also provided is a material for absorbing moisture in a clad nuclear fuel element.

BACKGROUND OF THE INVENTION

The present invention relates to apparatus for testing for the occurrence of fuel element cladding failures in nuclear reactors.

Leaking nuclear fuel assemblies have previously been located by various methods such as neutron flux tilting followed by measurements of concentrations, relative variations and nature of radioactive species appearing in the reactor coolant circuits, sampling of the coolant from various locations above the reactor core, and removing the fuel assemblies from the reactor for various types of failure testing. The most extensively applied method depends on sampling the reactor coolant and the detection in the samples of phenomena, such as delayed neutron emission or precipitation of certain radioactive by-products, which in the circumstances of the particular test can be presumed to indicate the presence of fission products. In order to give some indication of whereabouts in the core the fission products are escaping, samples have to be taken from different parts of the core and the more nearly one requires the origin of the failure signal to be traceable to an individual fuel element in the core, the greater becomes the number of different samples which have to be taken. Sampling devices such as pipes are needed for taking the different samples and therefore huge quantities of pipe can become necessary for conducting the samples to the detection instruments.

None of these methods have appeared satisfactory for expedient detection and location of failed fuel elements. This is because the probability for fast accurate location of a failure is relatively low and usually a combination of these various time consuming methods must be used. Also the chance for detection and location of more than one of several possible leaking assemblies is small, and the procedures used will usually involve long and costly periods of reactor shutdown.

Accordingly, it is the general object of this invention to provide a new and improved device for detection and location of failed nuclear fuel elements.

It is a more particular object of this invention to provide a new and improved fuel element failure detection device that can be positioned within each fuel element for expediently and accurately detecting and locating fuel element cladding failures.

It is also an objective of this invention to minimize the moisture contained within a clad nuclear fuel element by providing a moisture removing material in the interior thereof.

SUMMARY OF THE INVENTION

The present invention accomplishes the above cited objects by providing a device, capable of identifying fuel element cladding failures, within the gas plenum of each fuel element. In one example of this invention, the device comprises a ferromagnetic container which is suspended within the gas plenum of a nuclear fuel element by means of a wire. The wire is affixed at its upper end to the end plug of the fuel element (or to a plate situated at the top of the gas plenum) and at its lower end to an entrapped body that is trapped within the container by pieces of solid material that will crumble to powder when brought in contact with moisture. When fuel element cladding rupture occurs, reactor coolant, such as water, will leak or diffuse into the element causing distintegration of the solid material to the extent that these pieces of solid material no longer lock the entrapped body in the container. The container will then fall to the bottom of the element gas plenum. The position of the container may then be located by suitable detecting means such as a magnetic or an inductive detection device.

BRIEF DESCRIPTION OF THE DRAWINGS

For a better understanding of this invention reference may be had to the accompanying drawings, in which:

FIG. 1 is a longitudinal section of a nuclear fuel element embodying the principles of this invention; and FIG. 2 is an enlarged longitudinal section of the top portion of a nuclear fuel element of FIG. 1 showing the position of the container after a failure of the fuel element cladding has occurred.

DESCRIPTION OF THE PREFERRED EMBODIMENT

Referring now to an example of the embodiment of this invention illustrated in FIG. 1, there is shown a clad nuclear fuel element 10 constructed in accordance with the principles of this invention. The clad nuclear fuel element 10 includes a fuel free zone or gas plenum 12 normally located above the fuel pellets 24. The fuel pellets 24 are positioned in a tandem arrangement that extends longitudinally between the lower end plug 28 of fuel element 10 and the gas plenum 12. The fuel pellets 24 and gas plenum 12 are sealed within the fuel element cladding or casing 26 which extends longitudinally between the two end plugs 18 and 28. A ferromagnetic container 14, at least partially open at the top, is located within plenum 12 and is suspended therein by a wire 16 which is preferably non-magnetic. The wire 16 is affixed at its upper end to the top end plug 18 of fuel element 10 and extends down in a longitudinal direction into the gas plenum 12 where it is affixed at its lower end to a nonmagnetic entrapped body 20. The entrapped body 20 is positioned within container 14 and is trapped therein by pieces of solid material 22 positioned between the upper end of the container, which is partially open, and the entrapped body. The pieces 22 are formed from a material that will crumble to powder when brought in contact with reactor coolant, such as carbides of uranium, thorium, or calcium, all of which crumble when put in contact with water or water vapor.

The fuel 24 usually contains some water. During operation of the reactor, this water will eventually leave the fuel pellets and be absorbed and react with the pieces of material 22 carrying the container 14. The absorption of this water by the pieces of material 22 will preclude fuel element failures that might have been attributable to the corrosive action of this water on the interior of the cladding walls 26. The amount of water carried by the fuel inside an intact element 10 is small and will cause distintegration only of the outer surface of the material 22.

When a break or rupture of the fuel element cladding 26 occurs, water will leak or diffuse into the element 10 and cause disintegration of the material 22 to the extent that the pieces of material 22 no longer lock the entrapped body 20 in position. As illustrated in FIG. 2 the container 14 will then fall to the bottom of the gas plenum 12.

The time elapsing from the time of cladding 26 rupture until the container 14 is released will be a function of the rate of water leakage, and thus the size of the failure. A major cladding break, therefore, will quickly actuate the mechanisms. A small failure that will usually not cause reactor shutdown and can be tolerated for some time, depending on the rate of release of fission products from the entire core, will actuate the mechanism only after some delayed reaction time.

Using the described technique, a failed fuel element 10, or an assembly of such elements, will normally be located only during periods of reactor shutdown. An assembly of such elements being a spaced parallel array of fuel elements, for example, as shown in the Tong et al. Pat. No. 3,395,077, issued July 30, 1968, and assigned to the Westinghouse Electric Corporation. Only when the release of fission products exceeds the limits for safe or economical operation will it become necessary to replace the failed fuel. When the reactor head is removed for this purpose, the core will be accessible for leakage testing, and all failed fuel assemblies can relatively quickly be located and removed for replacement or repair. For locating the failed fuel elements having the container 14 at the bottom of the gas plenum 12, it is proposed that where nonmagnetic material is used for the fuel element cladding, magnetic switch detectors, desirably designed in the form of fingers and responsive to the change in position of the container 14 within the plenum 12, be inserted between parallel rows of fuel elements within the fuel assembly. Detection devices working on the principle of inductive forces may also be used. Such a device may be constructed in the form of a U-shaped magnetic core having a constant AC excited winding on one leg of the core. When the fuel element is positioned between the open legs of the magnetic core the presence or absence of the container 14 in that portion of the fuel element within the magnetic path can be detected by the change in reluctance of the magnetic circuit. When the container is present within the magnetic path it reduces the reluctance of the magnetic circuit and a change in voltage across the windings from the value that exists when the container is not present can be detected. With the current fuel assembly design the assemblies must be raised a little above the rest of the core, one or more at a time, to provide access for insertion of the failure detection device unless the detection device is built into the assembly. Lifting and lowering the assemblies will be the most time consuming part of the testing operation.

It will, therefore, be apparent that there has been disclosed a humidity responsive device that will expediently and accurately detect and locate failures in fuel element claddings so that faults can be rectified to quickly bring the reactor back into operation.

While there has been shown and described what are at present considered to be the preferred embodiments of the invention, modifications thereto will readily occur to those skilled in the art. For example, for special purposes, such as when experimental fuel is being used, in-core instrumentation can be provided to promptly detect the shift in position of the container, and thereby locate fuel element failures. This invention may also be used in reactors utilizing a coolant other than water, such as sodium, by providing a material within the fuel element plenum that would crumble when brought in contact with the reactor coolant. It is not desired, therefore, that the invention be limited to the specific arrangements shown and described and it is intended to cover in the appended claims all such modifications as fall within the true spirit and scope of the invention.

I claim as my invention:

1. A clad nuclear fuel element comprising a sealed casing member, nuclear fuel occupying a portion of the interior of said casing member and the remainder of said casing member forming a plenum, means for indicating an increase in humidity within said nuclear fuel element, said indication means being positioned within said plenum, means responsive to said indication means for detecting an abnormal increase in the presence of reactor coolant within said nuclear fuel element.

2. The nuclear fuel element of claim 1 wherein said indication means includes a container, said container being at least partially open at the top and an entrapped body being positioned within said container, solid means for trapping said entrapped body within said container, said solid means being positioned between the upper end of said container and said entrapped body, said solid means comprising a material that decomposes when brought in contact with a liquid so as to release said entrapped body from said container, means for suspending said container within said plenum, said suspension means being affixed to and extending between the top of said plenum and said entrapped body.

3. The nuclear fuel element of claim 2 wherein said solid means is selected from the group consisting of carbides of uranium, thorium and calcium.

4. The nuclear fuel element of claim 2 wherein said suspension means comprises a wire being affixed to and extending between the top of said plenum and said entrapped body.

5. The nuclear fuel element of claim 2 wherein said container is formed from a ferromagnetic material.

6. A clad nuclear fuel element comprising a sealed casing member, nuclear fuel occupying a portion of the interior of said casing member and the remainder of said casing member forming a plenum, means for removal of the water contained within said nuclear fuel element, said water removal means being positioned within said plenum.

7. The nuclear fuel element of claim 6 wherein said water removal means comprises a water absorbing material.

8. The nuclear fuel element of claim 7 wherein said water absorbing material is selected from the group consisting of carbides of uranium, thorium and calcium.

References Cited

UNITED STATES PATENTS

| | | | |
|---|---|---|---|
| 3,395,074 | 7/1968 | Douet et al. | 176—19 |
| 3,431,167 | 3/1969 | Hackney et al. | 176—19 |
| 3,395,677 | 7/1968 | Long Sun Tong et al. | 176—81 X |

CARL D. QUARFORTH, Primary Examiner

E. E. LEHMANN, Assistant Examiner

U.S. Cl. X.R.

176—19 LD, 80